United States Patent [19]

Nemirovsky et al.

[11] Patent Number: 5,426,674
[45] Date of Patent: Jun. 20, 1995

[54] METHOD AND COMPUTER SYSTEM FOR SELECTING AND EVALUATING DATA ROUTES AND ARRANGING A DISTRIBUTED DATA COMMUNICATION NETWORK

[76] Inventors: Paul Nemirovsky, 3 Bouldercrest Ct., Rockville, Md. 20850; Michael Ball, 1012 S. Mansion Dr., Silver Spring, Md. 20770

[21] Appl. No.: 141,502

[22] Filed: Oct. 25, 1993

Related U.S. Application Data

[63] Continuation of Ser. No. 475,871, Feb. 6, 1990, abandoned.

[51] Int. Cl.⁶ .................. G06F 15/00; G06F 15/20
[52] U.S. Cl. ......................... 395/200; 364/940.1; 364/942.3; 364/DIG. 2
[58] Field of Search ........................ 395/650, 200

[56] References Cited

U.S. PATENT DOCUMENTS

| | | | |
|---|---|---|---|
| 4,547,880 | 10/1985 | DeVita et al. | 370/91 |
| 4,860,276 | 8/1989 | Ukita et al. | |
| 5,079,760 | 1/1992 | Nemirovsky et al. | 370/17 |
| 5,216,591 | 6/1993 | Nemirovsky et al. | 370/17 |
| 5,253,161 | 10/1993 | Nemirovsky et al. | 364/402 |

FOREIGN PATENT DOCUMENTS

| | | |
|---|---|---|
| 0087174 | 8/1983 | European Pat. Off. |
| 0216704 | 4/1987 | European Pat. Off. |
| 0226960 | 7/1987 | European Pat. Off. |
| 0276326 | 7/1987 | European Pat. Off. |
| 0245821 | 11/1987 | European Pat. Off. |

OTHER PUBLICATIONS

Andrew Tanenbaum, *Computer Networks*, pp. 111–113, (1988).
Dimitri Bertsekas and Robert Gallager, *Data Networks*, pp. 360–406 (1987).

*Primary Examiner*—Kevin A. Kriess
*Assistant Examiner*—John Q. Chavis
*Attorney, Agent, or Firm*—Kenyon & Kenyon

[57] ABSTRACT

A method for constructing and utilizing a distributed data communication network that will meet its performance specifications in the most economical and efficient manner. The steps of the method include clustering terminals based on their proximity and traffic; selecting backbone node sites based on cost; designing the access network composed of terminals, concentrators, backbone nodes and the links between them; generating a backbone link topology; and determining routes in the backbone given the backbone topology and a traffic matrix.

26 Claims, 19 Drawing Sheets

Terminal/Host Clusters — v2.0

| Cluster No. | Design ID | V Coord | H Coord | Cluster Weight |
|---|---|---|---|---|

Design Locations — v2.0

| Clust# | Loc ID | V Coord | H Coord | Lata | St | Vir | Term | T/H Flag: | Conc | BackB |
|---|---|---|---|---|---|---|---|---|---|---|
| 0 | ALBIRM | 7518 | 2446 | 476 | AL | | 0 | Y | 0 | 0 |
| 0 | ALMONT | 7692 | 2247 | 478 | AL | | 0 | Y | 0 | 0 |
| 0 | ARLROC | 7721 | 3448 | 528 | AR | | 0 | Y | 0 | 0 |
| 0 | AZPHOE | 9133 | 6748 | 666 | AZ | | 0 | Y | 0 | 0 |
| 0 | AZTUCS | 9347 | 6469 | 668 | AZ | | 0 | Y | 0 | 0 |
| 0 | CAFRES | 8669 | 8239 | 728 | CA | | 0 | Y | 0 | 0 |

Terminal/Host Traffic — v2.0

| Source: Loc ID | Dev ID | Dest: Loc ID | Dev ID | Peak Byte | Profile ID |
|---|---|---|---|---|---|
| ALBIRM | T | CALANG | H | 61.5 | 1 |
| ALBIRM | T | DCWASH | H | 61.5 | 1 |
| ALMONT | T | CALANG | H | 209.6 | 1 |

Count: 3

Enter in peak byte traffic.
Char Mode: Repalce Page 1

FIG. 4

―――――――― Backbone Sites ―――――――― v.2.2

|  |  |  |  |  |  | ┌─ T1 Site ─┐ |  |  | Number of |
|---|---|---|---|---|---|---|---|---|---|
|  | Node |  |  |  | Chosen? | Chos? | Node | Switch | Increments |
| Loc ID | Dev | Num. | Cost | Avail | Exist | Y/N | Num | Y/N | Num | ID | Pack Line |
| ALMONT | BB | 5 | 4000.00 | 0 | N | N |  |  | BB |
| CALANG | BB | 8 | 4000.00 | 0 | N | N |  |  | BB |
| CAOAKL | BB | 7 | 4000.00 | 0 | N | N |  |  | BB |
| COAURO | BB | 6 | 4000.00 | 0 | N | N |  |  | BB |
| ILCHIC | BB | 4 | 4000.00 | 0 | N | N |  |  | BB |
| MABOST | BB | 0 | 4000.00 | M | N | N |  |  | BB |
| NJTREN | BB | 1 | 4000.00 | 0 | N | N |  |  | BB |
| OHCINC | BB | 3 | 4000.00 | 0 | N | N |  |  | BB |
| VARICH | BB | 2 | 4000.00 | 0 | N | N |  |  | BB |

Design Switches: PageDown Key    Count: #9

FIG.7A

―――――Concentrators―――――v2.0

| Loc ID | Dev ID | Node # | Chosen Switch Node # | Switch Type | Switch Cost | Avail (O.M) | Exist Y/N |
|---|---|---|---|---|---|---|---|
| ARLROC | LS | 2 | | S | 700.00 | 0 | N |
| CALANG | LS | 19 | | S | 700.00 | 0 | N |
| CADAKL | LS | 6 | | S | 700.00 | 0 | N |
| COAURO | LS | 3 | | S | 700.00 | 0 | N |
| DCWASH | LS | 13 | | S | 700.00 | 0 | N |
| FLTAMP | LS | 4 | | S | 700.00 | 0 | N |
| GAATLA | LS | 1 | | S | 700.00 | 0 | N |
| ILCHIC | LS | 15 | | S | 700.00 | 0 | N |
| ILSPRI | LS | 17 | | S | 700.00 | 0 | N |
| KYLOUI | LS | 16 | | S | 700.00 | 0 | N |
| LABROU | LS | 5 | | S | 700.00 | 0 | N |
| MABOST | LS | 9 | | S | 700.00 | 0 | N |
| MOKCIT | LS | 21 | | S | 700.00 | 0 | N |
| NCCHAR | LS | 20 | | S | 700.00 | 0 | N |

Average Computed Bytes per Packet (Profile 0): 65

Design Concentrators: PageDown Key          Count: 14

Char Mode: Replace   Page 1

FIG.7B

Terminal/Host Clusters —————v2.0

| Cluster No. | Design ID | V Coord | H Coord | Cluster Weight |
|---|---|---|---|---|

Design Locations

| Clust# | Loc ID | V Coord | H Coord | Lata | St | Vir | Term | T/H Flag: | Conc | BackB |
|---|---|---|---|---|---|---|---|---|---|---|
| 0 | ALBIRM | 7518 | 2446 | 476 | AL |  | 0 | Y | 0 | 0 |
| 0 | ALMONT | 7692 | 2247 | 478 | AL |  | 0 | Y | 0 | 0 |
| 0 | ARLROC | 7721 | 3448 | 528 | AR |  | 0 | Y | 0 | 0 |
| 0 | AZPHOE | 9133 | 6748 | 666 | AZ |  | 0 | Y | 0 | 0 |
| 0 | AZTUCS | 9347 | 6469 | 668 | AZ |  | 0 | Y | 0 | 0 |
| 0 | CAFRES | 8669 | 8239 | 728 | CA |  | 0 | Y | 0 | 0 |

Terminal/Host Traffic —————v2.0

| Source: Loc ID | Dev ID | Dest: Loc ID | Dev ID | Peak Byte | Profile ID |
|---|---|---|---|---|---|
| ALBIRM | T | CALANG | H | 61.5 | 1 |
| ALBIRM | T | DCWASH | H | 61.5 | 1 |
| ALMONT | T | CALANG | H | 209.6 | 1 |

Enter in peak byte traffic.
Char Mode: Replace Page 1                    Count: 3

FIG.8

```
┌─────────────────────── Backbone Sites ───────────────────────── v2.0 ─┐
│                                                         ┌ T1 Site ┐    Number of            │
│                      Node                      Chosen?  Chos? Node Switch  Increments       │
│ Loc ID  Dev  Num.  Cost      Avail  Exist      Y/N  Num Y/N  Num  ID       Pack  Line       │
│ ALMONT  BB    0    4000.00     0      N         N                  BB                       │
│ ILCHIC  BB    4    4000.00     0      N         N                  BB       1     1         │
│ MABOST  BB    5    4000.00     0      N         N                  BB       1     1         │
│ VARICH  BB    8    4000.00     0      N         N                  BB       1     1         │
│ CALANG  BB    1    6000.00     0      N         Y   4              BB       1     1         │
│ CAOAKL  BB    2    6000.00     0      N         Y   3              BB                       │
│ COAURO  BB    3    6000.00     M      N         Y   2              BB                       │
│ NJTREN  BB    6    6000.00     0      N         Y   0              BB       1     1         │
│ OHCINC  BB    7    6000.00     0      N         Y   1              BB                       │
│                                                     ┌─────────────────────┐                 │
│                                                     │ Desing Switches: PageDown Key │       │
│                                                     └─────────────────────┘                 │
└──────────────────────────────────────────────────────────────────────┘

Char Mode:  Replace Page 1                 Count: *9
```

FIG. 10A

─ Backbone Links Used for Backbone Node Location ─────── v2.1 ─

| Source | | Destination | | | Design | Speed | | |
|---|---|---|---|---|---|---|---|---|
| Loc ID | Node # | Loc ID | Node # | Avail? | Link | Kb/sec | Mult | Cost |
| ALMONT | 0 | ALMONT | 0 | 0 | ATT | 56 | 1 | 0.00 |
| ALMONT | 0 | CALANG | 1 | 0 | ATT | 56 | 1 | 4795.11 |
| ALMONT | 0 | CAOAKL | 2 | 0 | ATT | 56 | 1 | 5150.44 |
| ALMONT | 0 | COAURO | 3 | 0 | ATT | 56 | 1 | 3848.73 |
| ALMONT | 0 | ILCHIC | 4 | 0 | ATT | 56 | 1 | 3052.56 |
| ALMONT | 0 | MABOST | 5 | 0 | ATT | 56 | 1 | 3897.00 |
| ALMONT | 0 | NJTREN | 6 | 0 | ATT | 56 | 1 | 3470.32 |
| ALMONT | 0 | OHCINC | 7 | 0 | ATT | 56 | 1 | 2458.10 |
| ALMONT | 0 | VARICH | 8 | 0 | ATT | 56 | 1 | 2783.45 |
| CALANG | 1 | CALANG | 1 | 0 | ATT | 56 | 1 | 0.00 |
| CALANG | 1 | CAOAKL | 2 | 0 | ATT | 56 | 1 | 1985.68 |
| CALANG | 1 | COAURO | 3 | 0 | ATT | 56 | 1 | 3220.75 |
| CALANG | 1 | ILCHIC | 4 | 0 | ATT | 56 | 1 | 4810.60 |
| CALANG | 1 | MABOST | 5 | 0 | ATT | 56 | 1 | 6367.67 |
| CALANG | 1 | NJTREN | 6 | 0 | ATT | 56 | 1 | 6059.73 |
| CALANG | 1 | OHCINC | 7 | 0 | ATT | 56 | 1 | 4818.88 |

Design Links: PageDown Key    Count: 16

Char Mode: Replace Page 1

FIG.10B

―――――― Chosen Concentrators ―――――― v2.0

| Loc ID | Dev ID | Type | Node # | Chos # | Cost $ | FS | Avail (O.M) | Exist Y/N | Prob To BB | Delay To BB | # Lines | Load (bytes) |
|---|---|---|---|---|---|---|---|---|---|---|---|---|
| ARLROC | LS | S | 2 | 2 | 700.00 | Y | 0 | N | .989604 | .10205 | 16 | 1529 |
| CALANG | LS | S | 21 | 11 | 700.00 | Y | 0 | N | .9702 | .01258 | 8 | 2281 |
| CADAKL | LS | S | 6 | 4 | 700.00 | Y | 0 | N | .9702 | .01278 | 13 | 2688 |
| COAURO | LS | S | 3 | 3 | 700.00 | Y | 0 | N | .9702 | .0126 | 10 | 2447 |
| GAATLA | LS | S | 1 | 1 | 700.00 | Y | 0 | N | .989604 | .1292 | 16 | 2612 |
| ILCHIC | LS | S | 17 | 9 | 700.00 | Y | 0 | N | .989604 | .14495 | 8 | 2551 |
| KYLOUI | LS | S | 18 | 10 | 700.00 | Y | 0 | N | .9702 | .09005 | 4 | 652 |
| NEOMAH | LS | S | 0 | 0 | 700.00 | Y | 0 | N | .989604 | .08186 | 6 | 1107 |
| NJTREN | LS | S | 13 | 7 | 700.00 | Y | M | N | .989604 | .01465 | 27 | 7721 |
| NYSYRA | LS | S | 12 | 6 | 700.00 | Y | 0 | N | .9702 | .14061 | 9 | 986 |
| OHCINC | CN | B | 9 | 5 | 450.00 | Y | 0 | N | .9702 | .01571 | 4 | 756 |
| OHTOLE | LS | S | 16 | 8 | 700.00 | Y | 0 | N | .9702 | .08112 | 5 | 544 |

Average Computed Bytes per Packet (Profile 0): 65

Design Concentrators: PageDown Key

Char Mode: Replace Page 1    Count: *12

FIG.11

―――――― Local Access Links ―――――― v2.0

| Source Loc ID | Dv | Destin Loc ID | Dv | Speed Kb/Sec | Cost | Feas? | Chos? | Avail | Prop Delay | Traffic Flow | Link Delay |
|---|---|---|---|---|---|---|---|---|---|---|---|
| ALBIRM | T | ARLROC | LS | 19.2 | 2009.33 | N | N | .98 | 0 | 0 | |
| ALBIRM | T | GAATLA | LS | 19.2 | 1446.02 | Y | Y | .98 | 0 | .1 | .02722 |
| ALBIRM | T | KYLOUI | LS | 19.2 | 2145.58 | Y | N | .98 | 1 | .39 | .02765 |
| ALMONT | T | GAATLA | LS | 19.2 | 1463.22 | Y | Y | .98 | 0 | .34 | .02756 |
| ARLROC | LS | CALANG | BB | 9.6 | 979.03 | Y | N | .98 | 1 | 1.34 | .02912 |
| ARLROC | LS | CAOAKL | BB | 9.6 | 1042.67 | Y | N | .98 | 0 | 0 | |
| ARLROC | LS | COAURO | BB | 9.6 | 845.83 | Y | N | .98 | 0 | 0 | |
| ARLROC | LS | NJTREN | BB | 9.6 | 1023.44 | Y | N | .98 | 0 | 0 | |
| ARLROC | LS | OHCINC | BB | 9.6 | 688.65 | Y | Y | .98 | 0 | 2.45 | .06208 |
| | | | | | | | | | 2 | 9.79 | .11047 | of Links  SD=  SD=
           DS=  DS=

Char Mode: Replace Page 1    Count: 9

FIG. 12

Backbone Traffic and End to End Availability —————— v2.1

| Loc ID | Source Device | Node # | Loc ID | Destination Device | Node # | Peak Byte |
|---|---|---|---|---|---|---|
| CALANG | BB | 4 | CALANG | BB | 4 | 116.65 |
| CALANG | BB | 4 | CAOAKL | BB | 3 | 63.58 |
| CALANG | BB | 4 | COAURO | BB | 2 | 151.96 |
| CALANG | BB | 4 | NJTREN | BB | 0 | 589.64 |
| CALANG | BB | 4 | OHCINC | BB | 1 | 548.73 |
| CAOAKL | BB | 3 | CALANG | BB | 4 | 98.77 |
| CAOAKL | BB | 3 | CAOAKL | BB | 3 | 193 |
| CAOAKL | BB | 3 | COAURO | BB | 2 | 102.19 |
| CAOAKL | BB | 3 | NJTREN | BB | 0 | 470.82 |
| CAOAKL | BB | 3 | OHCINC | BB | 1 | 408.22 |
| COAURO | BB | 2 | CALANG | BB | 4 | 37.99 |
| COAURO | BB | 2 | CAOAKL | BB | 3 | 183.01 |
| COAURO | BB | 2 | COAURO | BB | 2 | 173.25 |
| COAURO | BB | 2 | NJTREN | BB | 0 | 368.34 |
| COAURO | BB | 2 | OHCINC | BB | 1 | 654.69 |
| NJTREN | BB | 0 | CALANG | BB | 4 | 368.96 |
| NJTREN | BB | 0 | CAOAKL | BB | 3 | 798.18 |
| NJTREN | BB | 0 | COAURO | BB | 2 | 317.91 |

Char Mode: Replace   Page 1                              Count: 18

FIG.13

```
────────────────────────── Backbone Links/Channels ──────────────────────────── v2.1
┌─── Source ───┐ ┌─────── Destination ───────┐         Speed    # of  Total
Loc ID Dev Node #  Loc ID  Dev Node # Chos?  Link ID  (Kb/sec) Lines  Util  Cost $
CALANG  BB         CAOAKL  BB          Y      ATT        56      1     .17  1985.68
CALANG  BB         COAURO  BB          Y      ATT        56      1     .11  3220.75
CALANG  BB         NJTREN  BB          Y      ATT        56      1     .21  6059.73
CALANG  BB         OHCINC  BB          N      ATT        56      0      0   4818.88
CAOAKL  BB         COAURO  BB          N      ATT        56      0      0   3406.89
CAOAKL  BB         NJTREN  BB          N      ATT        56      0      0   6264.95
CAOAKL  BB         OHCINC  BB          Y      ATT        56      1     .12  5052.33

──────────────────────── T1 Backbone Links/Channels ──────────────────────────── v2.1
┌─── Source ───┐ ┌─────── Destination ───────┐         Speed    # of  Total
Loc ID Dev Node #  Loc ID  Dev Node # Chos?  Link ID  (Kb/sec) Lines  Util  Cost $ Design Link Table:  PageDown Key Char Mode:  Replace Page 1              Count: 7
```

FIG.15

──── Routing Information ──── v2.0

| Route ID # | From Location | Device ID | To Location | Device ID | Traffic |
|---|---|---|---|---|---|
| 0 | NJTREN | BB | OHCINC | BB | 20.12 |
| 1 | NJTREN | BB | COAURO | BB | 2.54 |
| 2 | NJTREN | BB | CAOAKL | BB | 6.39 |
| 3 | NJTREN | BB | CALANG | BB | 2.95 |
| 4 | OHCINC | BB | NJTREN | BB | 8.37 |

──── Information on Routes ──── v2.0

| Route ID # | Order Number | From Location | Device ID | To Location | Device ID |
|---|---|---|---|---|---|
| 1 | 1 | NJTREN | BB | CALANG | BB |
| 1 | 2 | CALANG | BB | COAURO | BB |

Char Mode: Replace Page 1        Count: 11

FIG.16

——— Backbone End to End Delay ——— v2.1

| Location | Source Device | Node # | Destination Location | Device | Node # | Delay (seconds) | Avail |
|---|---|---|---|---|---|---|---|
| OHCINC | BB | 1 | CAOAKL | BB | 3 | .01262 | .9996 |
| COAURO | BB | 2 | CALANG | BB | 4 | .01271 | .9996 |
| OHCINC | BB | 1 | COAURO | BB | 2 | .01276 | .9996 |
| CAOAKL | BB | 3 | CALANG | BB | 4 | .01282 | .9996 |
| CALANG | BB | 4 | COAURO | BB | 2 | .01308 | .9996 |
| CAOAKL | BB | 3 | OHCINC | BB | 1 | .01328 | .9996 |
| CALANG | BB | 4 | CAOAKL | BB | 3 | .01379 | .9996 |
| COAURO | BB | 2 | OHCINC | BB | 1 | .0138 | .9996 |
| OHCINC | BB | 1 | NJTREN | BB | 0 | .01394 | .9996 |
| CALANG | BB | 4 | NJTREN | BB | 0 | .01429 | .9996 |
| NJTREN | BB | 0 | CALANG | BB | 4 | .01455 | .9996 |
| NJTREN | BB | 0 | OHCINC | BB | 1 | .01738 | .9996 |
| OHCINC | BB | 1 | CALANG | BB | 4 | .02334 | .999938 |
| CAOAKL | BB | 3 | COAURO | BB | 2 | .02384 | .998432 |
| COAURO | BB | 2 | CAOAKL | BB | 3 | .02429 | .998432 |
| CALANG | BB | 4 | OHCINC | BB | 1 | .02473 | .999938 |
| COAURO | BB | 2 | NJTREN | BB | 0 | .0248 | .998432 |
| CAOAKL | BB | 3 | NJTREN | BB | 0 | .02487 | .998432 |

Char Mode: Replace Page 1   Count: 18

FIG. 17

METHOD AND COMPUTER SYSTEM FOR SELECTING AND EVALUATING DATA ROUTES AND ARRANGING A DISTRIBUTED DATA COMMUNICATION NETWORK

This application is a continuation of U.S. Pat. application Ser. No. 07/475,871, filed on Feb. 6, 1990, now abandoned.

FIELD OF THE INVENTION

This invention relates to distributed data communication networks, and more particularly, to a method for constructing and utilizing a distributed data communication network that will meet its performance specifications in the most economical and efficient manner.

BACKGROUND OF THE INVENTION

A distributed data communication network is a hierarchical system of hardware components arranged so that each hardware device is connected, directly or indirectly, to every other device. At the lowest level are user terminals or hosts, which form part of the access network. These terminals are linked to one or more concentrators, a statistical multiplexer often with protocol converters and several low data rate output lines and a fewer number of high data rate output data lines. The concentrators form the second level of the hierarchy and, together with the terminals, form the access network.

The concentrators, which may be connected to other concentrators in a hierarchical fashion, are ultimately connected to the backbone, which forms the highest level in the hierarchy. The backbone consists of high speed, high capacity links that terminate at backbone nodes. A backbone node consists of one or more devices, and includes a switching device for routing traffic within the backbone. The data traffic from the concentrators enters the backbone at a backbone node.

Existing methods for utilizing a distributed data communication network have deficiencies that are overcome by the present invention. Some of these methods were only capable of evaluating each level of the hierarchy independently of all the others. For example, the topology of the backbone links connecting the backbone nodes would be arranged for optimal performance independently of the access network. This method, whereby each level of the hierarchy is optimized independently of all the others, does not necessarily produce a distributed data communication network that operates most economically or efficiently.

Other so called vendor-specific methods can only be used to design a distributed data communication network with equipment provided by a limited number of vendors, and in many cases with equipment provided by only a single vendor. Still other generic methods, while not limited to specific vendors' hardware, do not address the hardware capabilities with sufficient detail to permit the selection of particular hardware components. Finally, other existing methods can only be used to design backbone links composed of T1 links or 56 Kbps links, but not a hybrid of both.

SUMMARY OF THE INVENTION

The present invention is directed to a method and apparatus used in constructing and utilizing a distributed data network that overcomes the limitations of the prior art. More specifically, the invention utilizes an interactive personal computer-based tool used to select and arrange distributed data communication networks that make use of existing communications equipment.

The invention employs a sequence of steps for the optimization of equipment that automatically achieves effective network configurations. It also provides for graphical network display and editing. These features allow users to generate customized configurations as well as to modify the configurations generated by the system. Furthermore, users can invoke network analysis that will evaluate any design. All the data utilized by the invention is maintained by a relational data base management system.

The system for analyzing the network consists of five modules, each containing its own subsystem for analyzing, evaluating and constructing the network. Four of the modules are used to construct the actual network, with each module designing a different level of the hierarchy. The remaining module finds the optimal routes for the traffic in the backbone network once the basic network has been fixed.

In general, the modules are arranged sequentially such that the outputs from one module are used as inputs in the next module. However, the output from a later module can be fed-back as input into an earlier module in order to improve the network's configuration. Ideally, each aspect of the process requires the results of all the other parts of the process as input. For example, in determining the geographic location of concentrators, it would be desirable to have as input the location of the backbone nodes in order to compute the cost of connecting a concentrator to the backbone. It would also be desirable to have as input the complete backbone topology so that an estimate of the cost of transporting traffic from the concentrators through the backbone could be made. Obviously, it is not in general possible to have the rest of the configuration available when any particular part of the process is begun. By using an iterative procedure, however, the results of a configuration step occurring later in the process can be fed-back into a step earlier in the cycle. This method results in a network that is better optimized to meet its specification requirements than the networks that use the existing methods.

Each module in the process takes as input relevant data from other parts of the configuration or, when such data is not available, parameters are used to estimate such data. During the initial iterations, these parameters are specified based on experience with similar types of problems, or if no such experience is available, they are specified on the basis of general knowledge of network principles. Each parameter has a reasonable default value which can be used if no other basis is available for its specification.

The user has as much or as little control over the decision making process as desired. It is possible for the system to operate in an almost completely automatic mode, producing a complete design with little user interaction. Alternatively, the user can continuously interact with the system by inputting a partially selected arrangement, requiring that the system complete the construction, and finally inputting the corrections to the configuration that have been made by the system.

The above is a brief discussion of some of the prior art and features of the invention. Other advantages of the invention can be gleaned from the detailed discussion of the preferred embodiment that follows.

BRIEF DESCRIPTION OF THE DRAWINGS

FIG. 4 is an input data table for some of the terminals shown in FIG. 3.

FIG. 7 shows the output of the terminal clustering module in tabular form.

FIG. 8 shows the input data concerning the data terminals for the backbone node location module.

FIG. 10 shows the output of FIG. 9 in tabular form.

FIG. 11 shows the concentrators chosen by the access configuration and analysis module in tabular form.

FIG. 12 shows the output data concerning the local access links determined by the access configuration and analysis module.

FIG. 13 shows the output data concerning the traffic through the backbone and the availability of traffic routes between backbone nodes.

FIG. 15 shows the network configuration of FIG. 14 in tabular form.

FIG. 16 is an output table from the backbone routing, delay and reliability analysis module showing the routing information FIG. 17 is an output table from the backbone routing, delay and reliability analysis module showing the link delay data.

DETAILED DESCRIPTION OF THE PREFERRED EMBODIMENT

Figure 1:
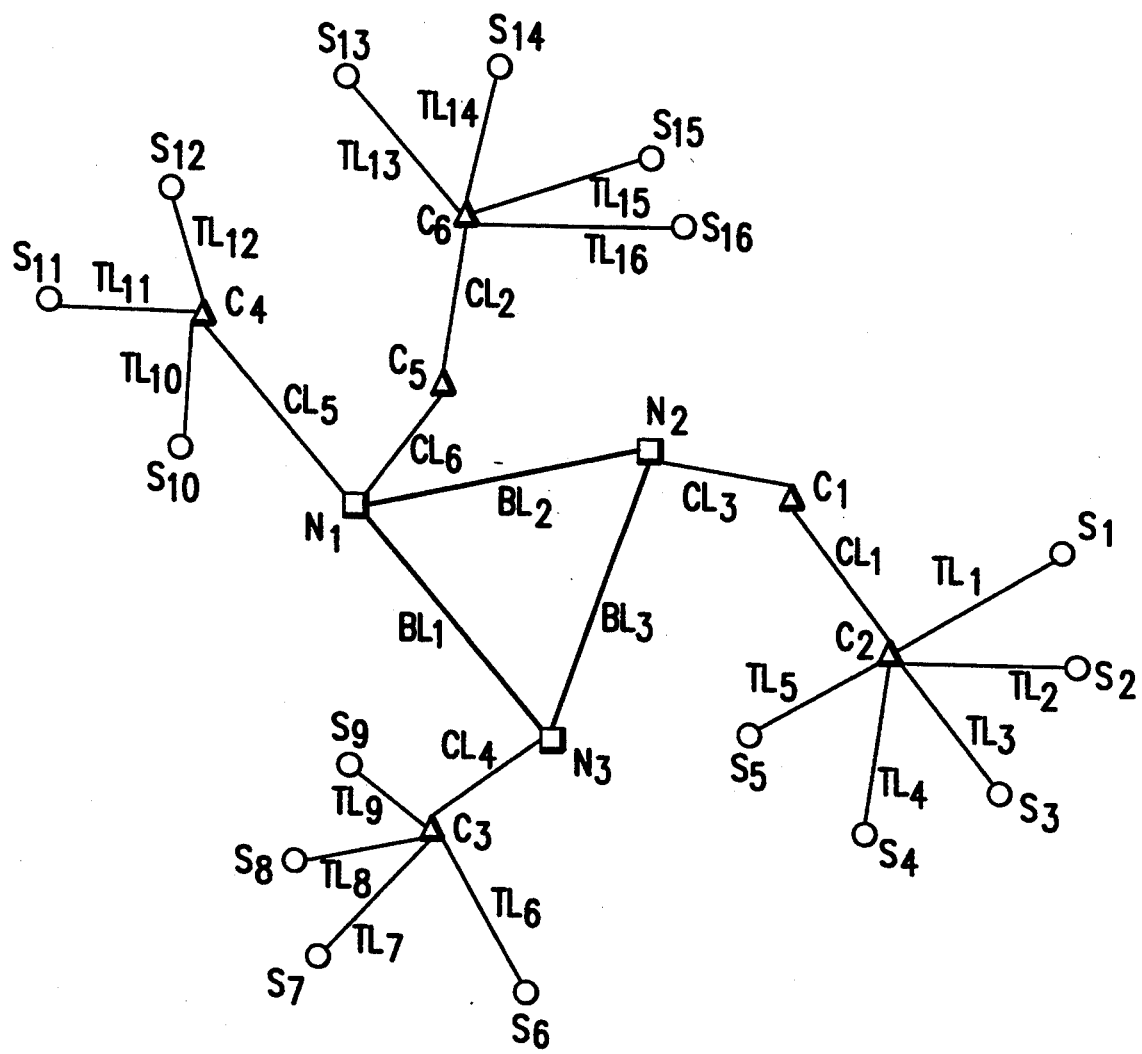
FIG. 1 is a schematic diagram depicting a distributed data communication network, which includes backbone nodes, concentrators, and traffic sources, as well as the data link lines between them.

An example of a distributed data communications network is shown in FIG. 1. The network is depicted as a set of interconnected data terminals $S_1$–$S_{16}$. The terminals are connected to concentrators $C_1$–$C_6$ such as Telenet Communications Corporation model number TP 3000 or TP4 series multiplexers. The concentrators are in turn connected to backbone nodes $N_1$–$N_3$, which contain data switches such as a Telenet Communications Corporation TP4/III or TP4/II series switch. The traffic sources $S_1$–$S_{16}$ are connected to the concentrators $C_1$–$C_6$ by data link lines $TL_{1-15}$ that are leased from the transmission providers. The concentrators $C_1$–$C_6$ may be connected to other concentrators $C_1$–$C_6$ by data link lines $CL_1$–$CL_2$, or, the concentrators can be connected directly to the backbone nodes by data links $CL_3$–$CL_6$. Both of these types of lines are leased from the transmission providers. The backbone nodes $N_1$–$N_3$ are connected together by backbone data link lines $BL_1$–$BL_3$, which are high-volume leased data lines. The invention is a method for determining the set of location/device combinations for the backbone nodes and concentrators, as well as the links between them, given a set of terminal locations and the traffic, that will have the least cost while meeting the specification requirements. The traffic is the quantity of data per unit time that is transmitted through the lines.

The hardware components shown schematically in FIG. 1 can represent a variety of hardware devices. Each terminal/host $S_i$ represents either a physical user terminal, or a virtual terminal composed of an aggregate of more than one physical terminal. In general, a single physical location may have more than one hardware device. For example, a backbone node location $N_i$ can have, in addition to a switch, other devices such as concentrators. The links $TL_i$, $Cl_i$, and $Bl_i$ can also be analog or digital communication lines.

Figure 2:
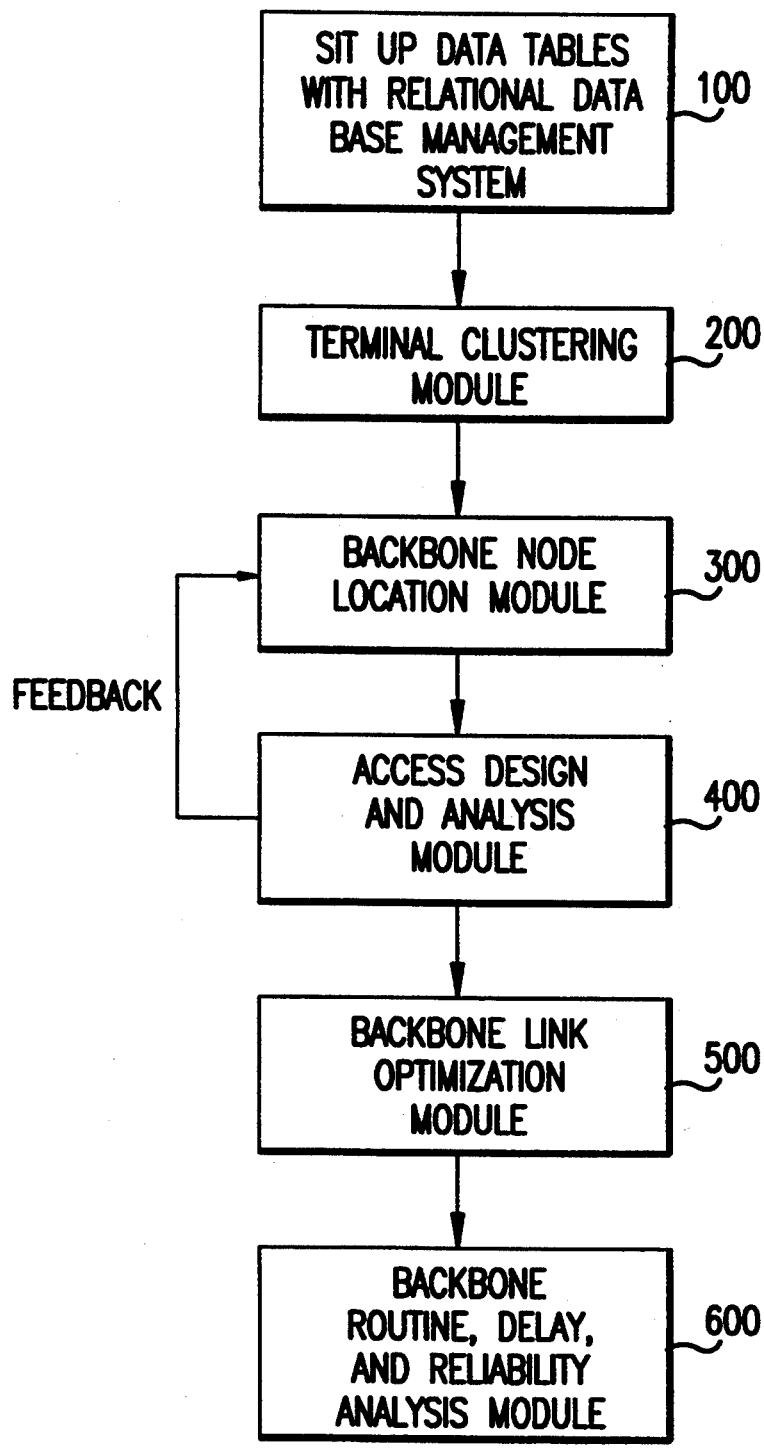
FIG. 2 is a flow diagram illustrating the steps of the present invention.

The five modules which make up the invention are terminal clustering, backbone node location, access network design and analysis, backbone link optimization and routing, and finally, delay and reliability analysis. FIG. 2 is a flow diagram illustrating these steps of the present invention. It includes Block 100, which is the initial set up of the data tables by the relational data base management system. Each of these five modules will be discussed in detail.

The first module in the network design system is the terminal clustering module, indicated by block 200 in FIG. 2, which forms clusters of terminals based on their proximity and traffic. Its purpose is to reduce the number of terminals that must be considered during the later stages of the design process. It can produce as output either virtual terminals, candidate backbone sites, or candidate concentrator sites. Each virtual terminal represents several real terminals, thereby reducing the number of traffic sources that must be handled by the backbone node location module, thus simplifying the construction problem. If desired, this module can also narrow down the set of candidate backbone sites and the set of candidate concentrator sites that were chosen as candidates initially. The smaller set of candidates chosen by this module are used as potential backbone sites and concentrator sites in the later modules.

This module takes as input a set of terminal locations that are to be clustered and a weight for each one that represents the data traffic carried by that location. The parameters of this module to be specified by the user include: the total number of clusters to be formed; the minimum weight of the smallest cluster; the maximum weight assigned to a single cluster; and the maximum distance from the center of the cluster that a terminal assigned to it can be located. If desired, the user can constrain each cluster to a local access and transport area (LATA). Also, the user can manually select the location of cluster centers. If the location of the cluster center is left unspecified, the location will be automatically determined by the module based on the weighted traffic volume of each terminal location coordinates (V,H). The output of this module are the clusters formed and the terminals associated with them, as well as the weight of each cluster. Thus, the output is essentially in the same form as the input and it can be thought of as defining a reduced problem of the same type.

The next module is the backbone node location module, indicated by block 300 in FIG. 2, which selects a set of backbone nodes based on costs. It uses as its input candidate backbone node locations, data traffic source locations (terminals or virtual terminals), and a traffic table, which specifies the traffic between these sources. The module works by balancing the costs of the backbone (backbone node switch hardware and backbone link data line costs) against the cost of the local access network (terminal-to-concentrator and concentrator-to-backbone node line costs).

As additional nodes are added to the network, the length of the lines, and hence the cost, between the local access network and the backbone nodes decreases. However, a point is reached at which the cost of adding an additional node to the network will be greater than the savings resulting from the decreased line costs. This module balances these considerations. In this evaluation mode, the invention can determine the cost savings or increases incurred in incrementally adding or deleting nodes from the backbone. Both the backbone and the local access efficiencies are approximated. The module can also take as input a partial list of backbone locations which have been chosen by the user and select the remaining sites. In another mode of operation, the module can evaluate the efficiency and performance of a backbone composed entirely of node locations specified by the user. This module's performance is determined by values of several key parameters. Among them are "access" parameters influencing local access cost, a "detour" parameter effecting backbone costs and "link utilization", defining the allowable line utilization.

The access configuration and analysis module, indicated by block 400 in FIG. 2, consists of two parts. The first part configures the access network, which is composed of terminals, concentrators, the links between terminals and concentrators, the links between concentrators and concentrators, and the links between concentrators and backbone nodes. It also selects concentrators from the list of candidates. A concentrator candidate consists of a potential concentrator location as well as the number and type of devices to be placed at that location. The user therefore has the flexibility of specifying which types of devices are permissible at each location.

The inputs are the set of concentrator candidates, the set of terminals, and the terminal level requirements for both the number of data communication lines and the volume of traffic. The module uses a model of concentrator costs and capacities as well as terminal to concentrator connection costs. The user may also specify mandatory and existing concentrator sites and associate specific terminals to specific concentrators. Thus, it is possible to use this module for both initial and incremental configuration.

The local access module's key parameters define a number of terminal-concentrator links, cost parameters for that level of concentration (1-level, 2-level designs), and trade-off costs between terminal-concentrator and terminal-backbone connectivity.

The access analysis portion of this module calculates several performance attributes of the access network. Using as input the data traffic requirements between the terminals, the module routes the traffic through the access network and derives two reduced traffic requirement matrices. One list is for traffic accumulated at the concentrator level and the other is for traffic accumulated at the backbone level. For each backbone node, the average delay is computed to and from the backbone. Two reliability measures are calculated; the probability of a packet reaching the backbone assuming it has reached the node, and the expected flow to and from the backbone, given the probability of network link and node failures. This module allows for the design of very general hierarchical access networks. In particular, a lower level concentrator or terminal can be homed to several devices at a higher level. However, it is assumed that all the terminals are homed to concentrators. They cannot be homed directly to backbone nodes. The traffic requirements are determined between terminals, concentrators and backbone nodes.

The fourth module is the backbone link optimization module, indicated by block 500 in FIG. 2, which generates a backbone link topology. It uses as its input a set of backbone node locations, a backbone traffic matrix, which contains the traffic accumulated at the backbone level, and a list of links which are candidates for inclusion in the backbone topology. This module can generate a single speed topology considering transmission tariff, including the costs of leasing lines to carry data over the required distance. Alternatively, the module can design a two-level network. The lower of the two levels will be a high speed "slow" circuit switched network (a T1 network), which is used to provide individual channels for the higher level, packet-switched network.

Two different evaluation techniques may be accessed through this module. One generates a 56 Kbps level network and possibly also a T1 level network as well. The other generates a T1 level network based on a set of 56 Kbps channel demands.

Whenever this system is run, the following summary statistics are produced: the total cost of all physical backbone links, including direct backbone node to backbone node 56 Kbps links and T1 links; and the total costs of all logical channels derived from T1 links. The module normally derives the costs of these logical channels using the standard tariffs. The traffic weighted average backbone node to backbone node delay through the backbone is also calculated. In addition, an estimate is made of the traffic weighted average backbone node to backbone node availability. The detour factor, which is the cost of the shortest path between a pair of backbone nodes divided by the cost of a direct link between these same nodes, is also determined. The resulting value is the traffic weighted average for each node.

The backbone routing, delay, and reliability analysis module, indicated by block 600 in FIG. 2, finds routes in the backbone network given a backbone topology (connectivity) and a backbone traffic matrix. The module functions on the level of backbone nodes clusters; both the topology and traffic matrix are specified on the cluster level. The module also includes an algorithm for routing in the TP-7 network "slow" circuit switching. In addition to producing routes for all requirements, the module yields an analysis of delay and throughput. If the results of this analysis are not satisfactory, then the topology may be changed either by using the manual editing capabilities provided with the analysis module or by returning to the topological optimization module and rerunning the algorithms with different parameter settings.

After the user has obtained the results from any of the above modules, one or more of the modules can be rerun with different parameter settings. This capability provides a mechanism for feeding back the users' own assessment of the results of each algorithm. An additional and more important type of feedback can be accomplished by rerunning a module based on the results obtained from a later module. Whenever an earlier module is rerun, however, all the results from the later modules are invalidated. For example, if the backbone node locations are recalculated (using the backbone node location module) after the local access and the backbone link designs have been completed, then both the local access design and the backbone link design will be invalid.

The present invention provides explicit support for feedback between two of the modules. As illustrated in FIG. 2, the results from the access design module can be fed-back into the backbone node location module. This type of feedback is particularly important because the concentrators are actually the true traffic sources as far as the backbone nodes are concerned. Furthermore, it is almost always desirable that each backbone node location coincide with the concentrator location. Therefore, in order to accurately locate the backbone nodes, it is important to first determine the concentrator locations.

This feedback of the concentrator locations into the backbone node location module is accomplished by using the terminal cluster module to regenerate both virtual terminals and candidate backbone sites. The current set of concentrator locations, which have already been chosen, should be used as fixed cluster centers. The backbone node location module can now be reentered in the virtual terminal mode and rerun to define new backbone locations given selected concentrators, creating a feedback iteration. The result should be an improved set of backbone node locations.

Figure 3:
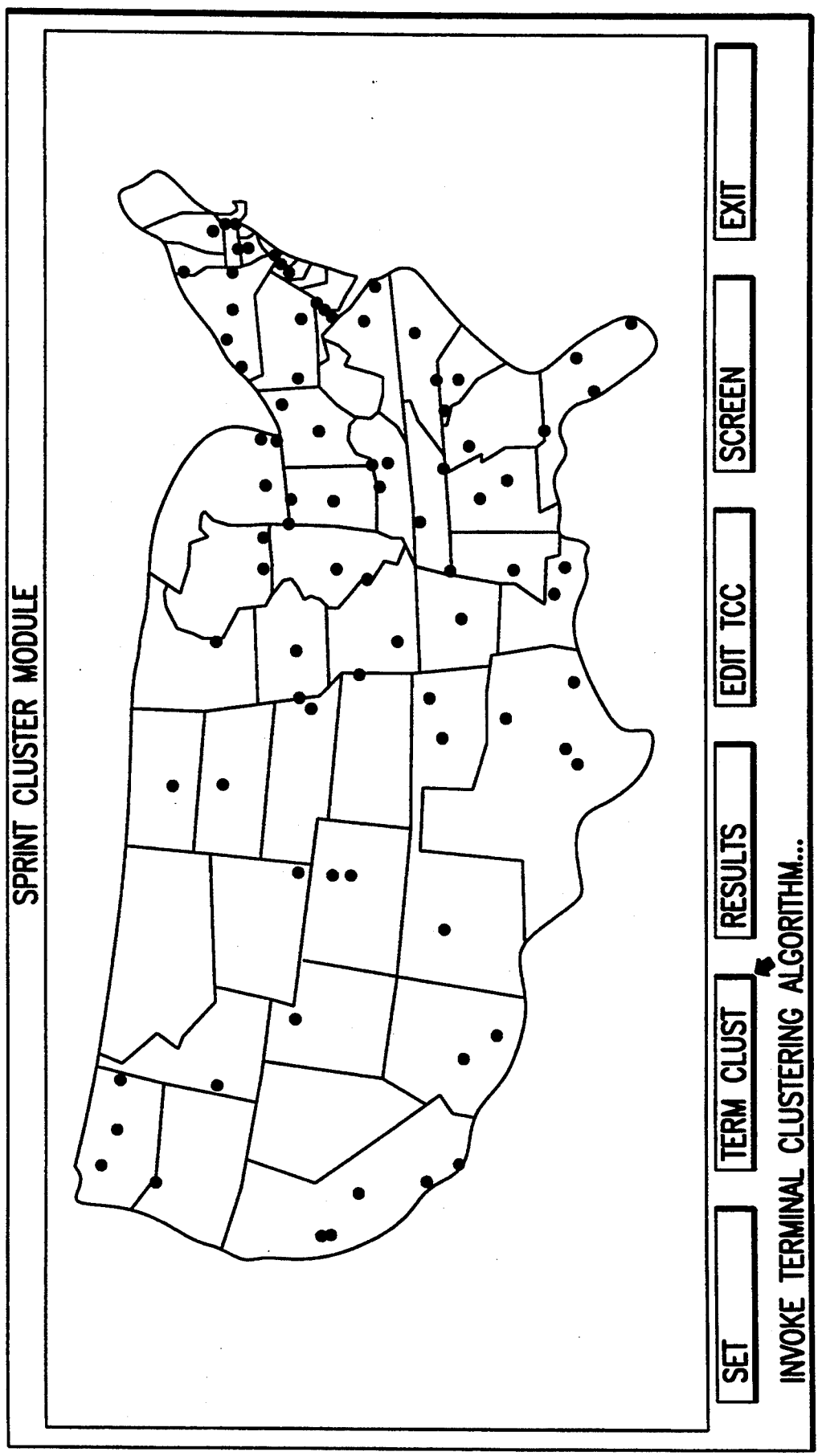
FIG. 3 is a map showing the distribution of terminals to be clustered.

For the purposes of illustrating the method of the present invention, numerical examples will be presented which correspond to the distribution of terminals shown in FIG. 3. The first Step 200 is terminal clustering, for which it is necessary to input each terminal's geographic coordinates, the traffic associated with it and an indication as to whether it should be considered as a candidate backbone or concentrator location. A portion of this information is shown in tabular form in FIG. 4.

Figure 5:
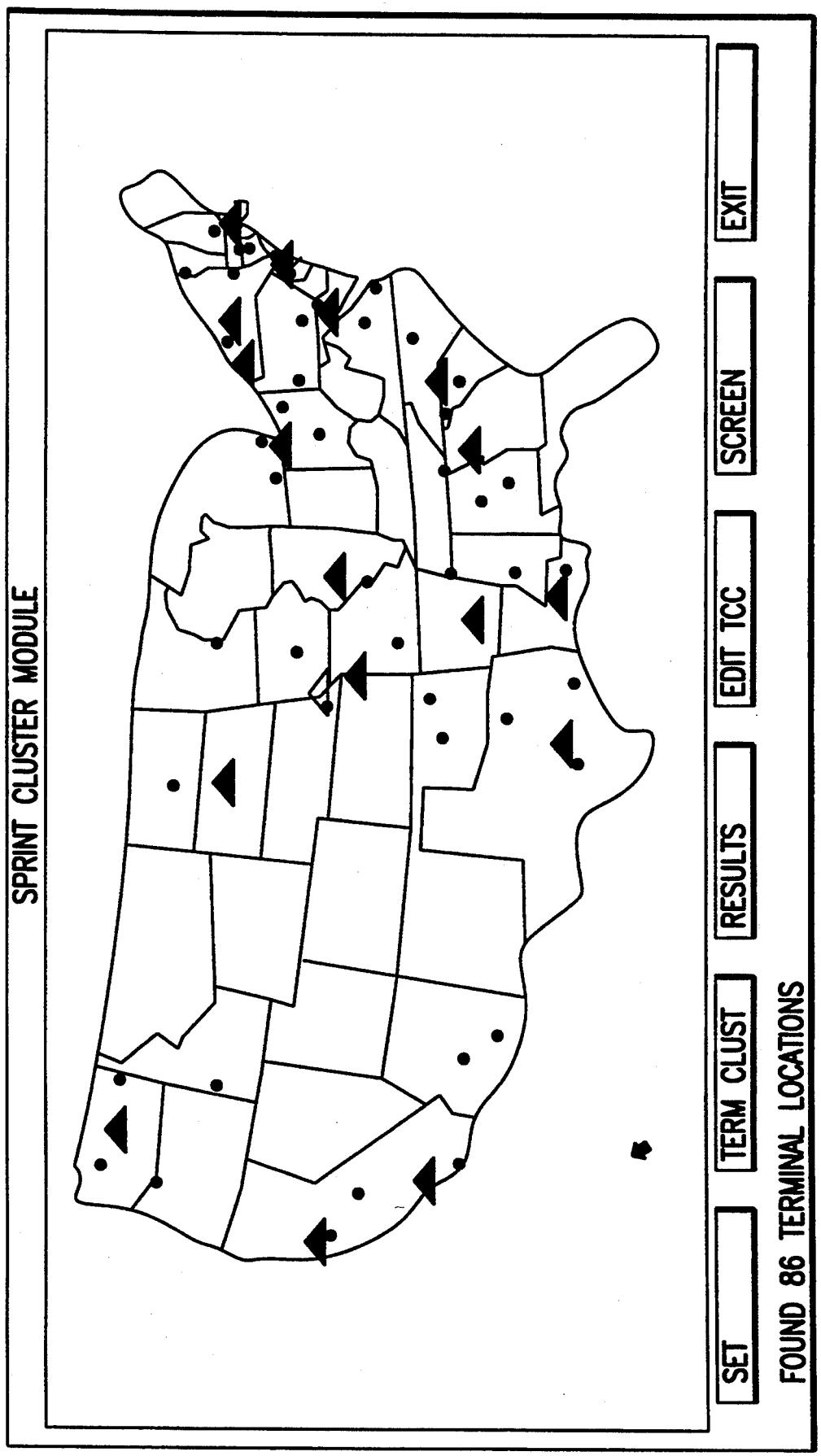
FIG. 5 shows a map of the output for the candidate cluster sites and the candidate concentrator sites.
Figure 6:
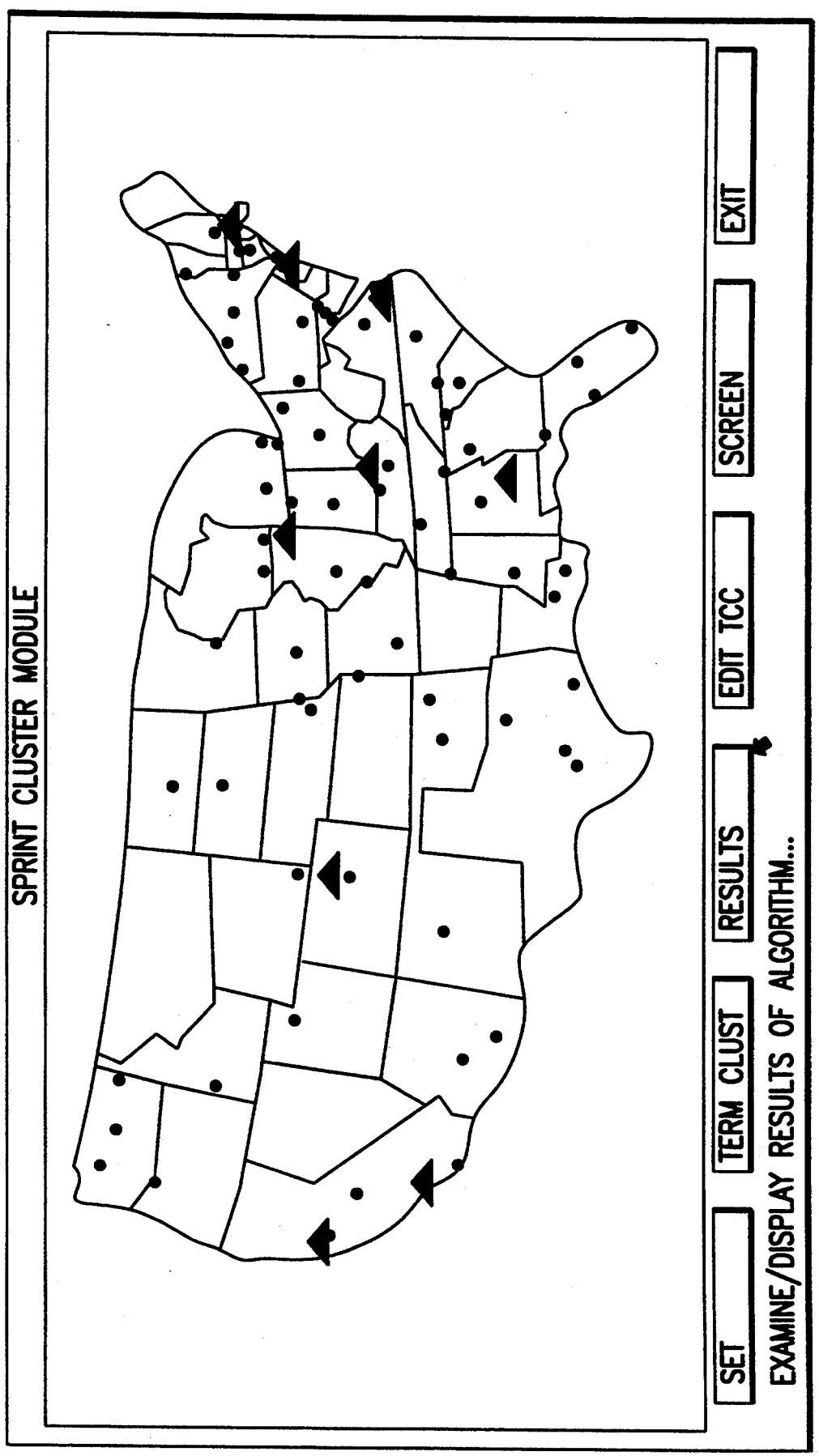
FIG. 6 shows a map of the output for the candidate cluster sites and the candidate backbone sites.

The outputs of the terminal clustering module are shown in FIGS. 5–7. FIG. 5 shows candidate cluster sites as solid circles and candidate concentrator sites as solid triangles. FIG. 6 shows the candidate cluster sites and the candidate backbone sites, which are now indicated by solid triangles. FIG. 7 shows the output of the terminal clustering in tabular form, indicating both the candidate concentrator and the candidate backbone sites.

For the backbone node location module 300, it is necessary to provide as input, in addition to the information above concerning the candidate backbone node locations, a traffic table specifying the traffic between the terminals. An example of this input table is shown in FIG. 8. The traffic volume between the terminals can be specified in the form of bytes, packets, or calls.

Figure 9:
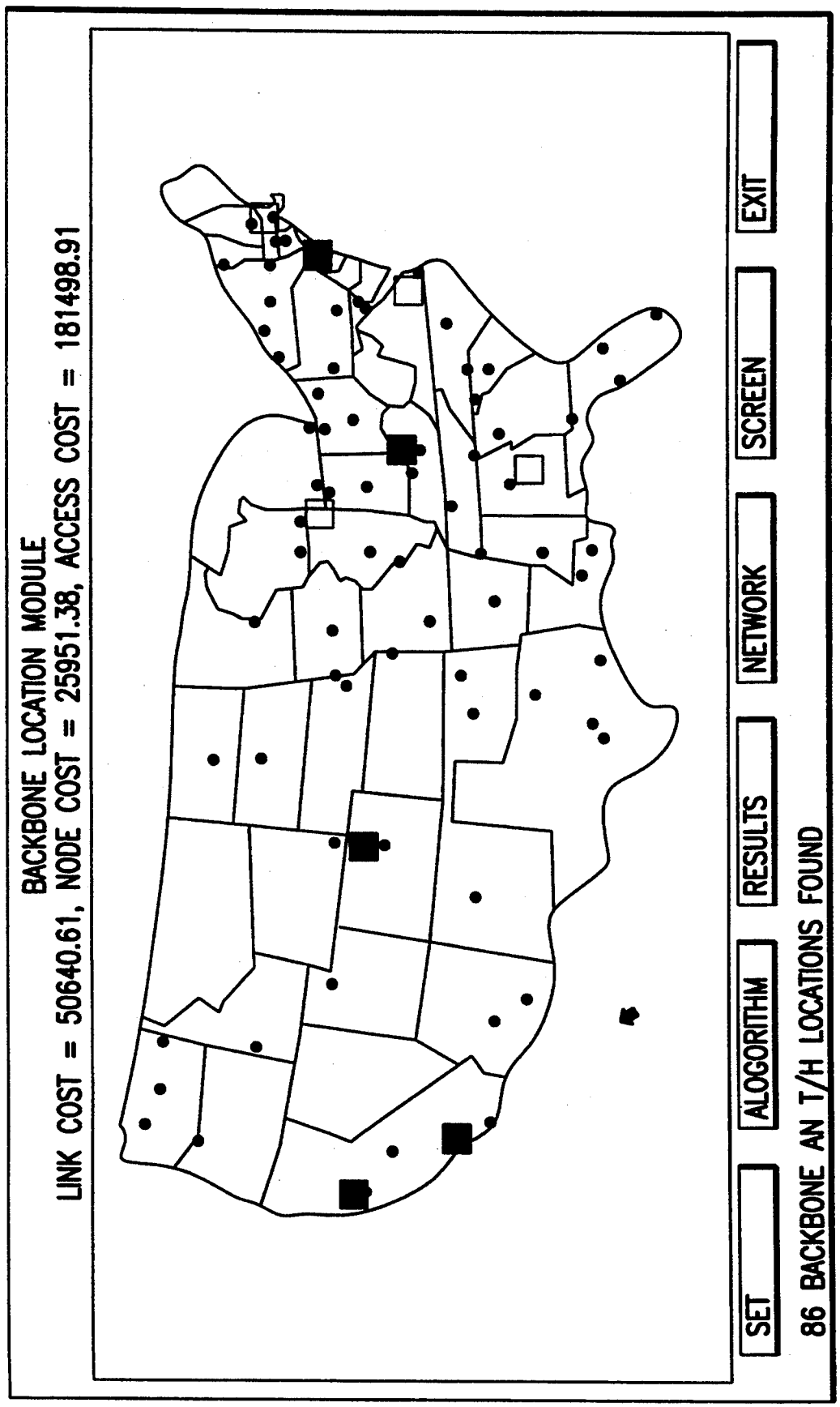
FIG. 9 shows a map of the data terminals and candidate backbone node sites selected by the backbone node location module.

Based on these inputs, the method of the invention configures the network shown in FIG. 9. Information about the selected backbone nodes is shown in tabular form in FIG. 10.

Using the above tables as input, the access configuration and analysis module 400 yields the outputs shown in FIGS. 11–13. Information about the concentrators chosen for this network is presented in tabular form in FIG. 11. Information about the local access links is presented in FIG. 12, while information about the traffic through the backbone and the availability of traffic routes between backbone nodes is presented in FIG. 13.

Figure 14:
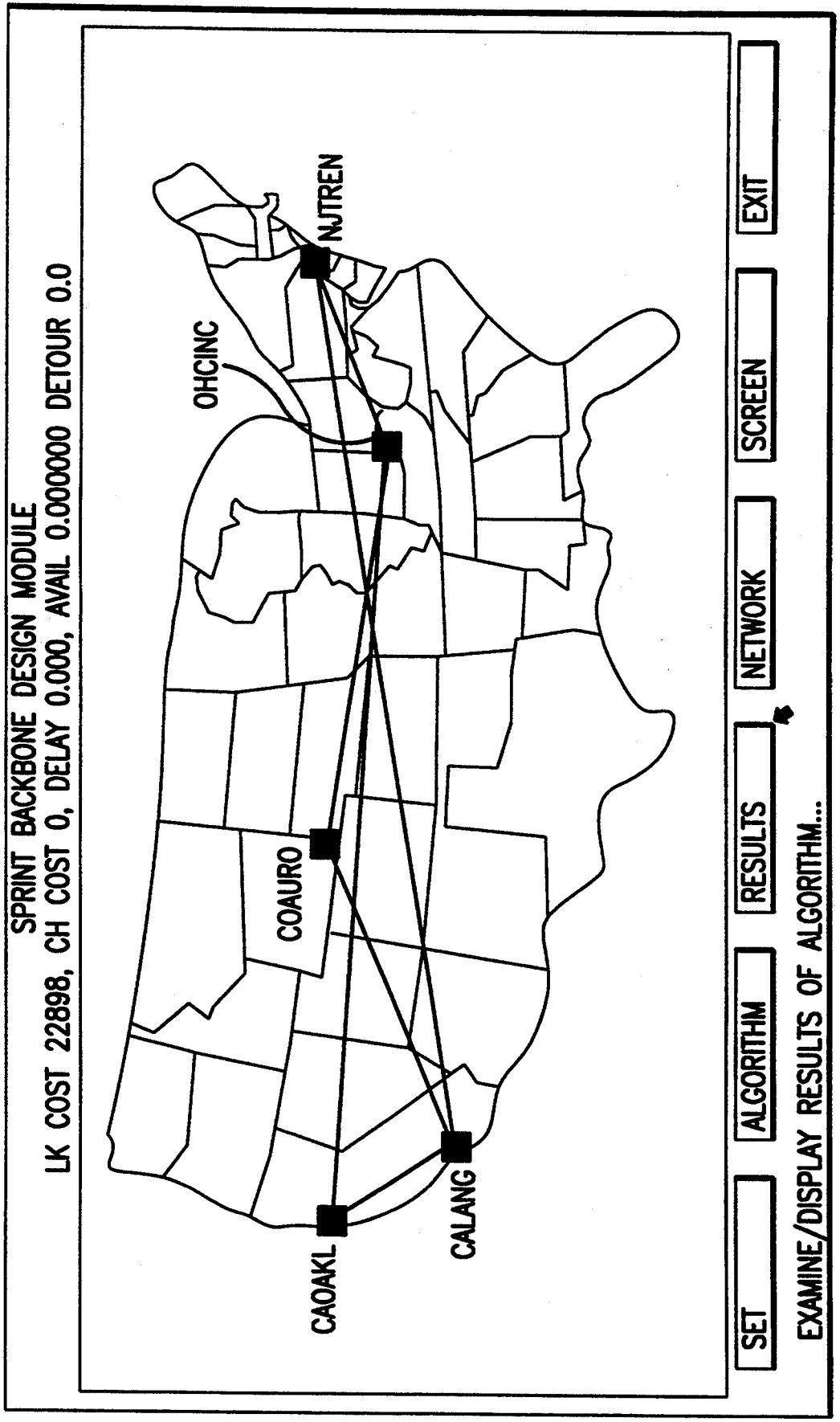
FIG. 14 shows the final network configuration produced by the backbone link optimization module.

The backbone link optimization module 500 produces as output the final network configuration shown in FIG. 14. This configuration is also shown in tabular form in FIG. 15.

The backbone routing, delay and reliability analysis module 600 uses as input the data from FIG. 15. A sample output resulting from the method of the invention is shown in FIGS. 16 and 17. FIG. 16 includes the routing information and FIG. 17 includes the link delay data.

The preferred embodiment of the present invention described above represents one desirable, workable embodiment of the present invention. It is to be understood that the methodology described herein is not limited to specific forms disclosed by way of example and illustration, but may assume other embodiments and methods limited only by the scope of the appended claims and their equivalents.

What is claimed is:

1. A computer based method for selecting and evaluating data routes and arranging a data communication network having a number of terminals, said arranged network including backbone nodes, a plurality of first links connecting the backbone nodes, concentrators connected between said terminals and said backbone nodes, a plurality of second links disposed between and connecting said terminals and said concentrators, and a plurality of third links disposed between and connecting said concentrators and said backbone nodes, said method comprising steps of:
   (a) clustering said terminals into terminal clusters and assigning said terminal clusters to virtual terminals, concentrator locations, or backbone node locations;
   (b) selecting said backbone nodes from a set of backbone nodes to minimize the cost of the network and adding said selected backbone nodes to the network;
   (c) selecting said concentrators from a set of concentrators, assigning said clustered terminals to said selected concentrators, and adding said selected concentrators to the network;
   (d) selecting said first links from a set of first links to minimize the cost of said first links and said backbone nodes and adding said selected first links to the network to connect the selected backbone nodes; and
   (e) evaluating routes for data traffic between said selected backbone nodes through said selected first links and allocating data traffic among said routes.

2. The method for selecting and evaluating data routes and arranging a data communication network according to claim 1, further comprising a step of repeating any one or more of the steps (a) through (e) to further refine the network configuration in response to a previously performed one or more of said steps (a) through (e).

3. The method for selecting and evaluating data routes and arranging a data communication network according to claim 2, wherein said step (b) of selecting said backbone nodes from a set of backbone nodes and adding said selected backbone nodes to the network is repeated to further refine the network configuration in response to said step (c) of selecting said concentrators from a set of concentrators.

4. The method for selecting and evaluating data routes and arranging a data communication network according to claim 1, wherein the concentrators are statistical multiplexers with protocol conversion capabilities.

5. The method for selecting and evaluating data routes and arranging a data communication network according to claim 1, wherein said backbone nodes include data switches.

6. The method for selecting and evaluating data routes and arranging a data communication network according to claim 1, wherein said second links are data lines of telephone service providers.

7. The method for selecting and evaluating data routes and arranging a data communication network according to claim 1, wherein said first links are high volume data lines.

8. The method for selecting and evaluating data routes and arranging a data communication network according to claim 7, wherein said high volume data lines are fiber optic lines.

9. A computer system for selecting and evaluating data routes and arranging a data communication network having a number of terminals, said arranged network including backbone nodes, a plurality of first links connecting the backbone nodes, concentrators connected between said terminals and said backbone nodes, a plurality of second links disposed between and connecting said terminals and said concentrators, and a plurality of third links disposed between and connecting said concentrators and said backbone nodes, said computer system comprising:
(a) means for clustering said terminals into terminal clusters and assigning said terminal clusters to virtual terminals, concentrator locations, or backbone node locations;
(b) means for selecting said backbone nodes from a set of backbone nodes to minimize the cost of the network and adding said selected backbone nodes to the network;
(c) means for selecting said concentrators from a set of concentrators, assigning said clustered terminals to said selected concentrators, and adding said selected concentrators to the network;
(d) means for selecting said first links from a set of first links to minimize the cost of said first links and said backbone nodes, and for adding said selected first links to the network to connect the selected backbone nodes; and
(e) means for evaluating routes for data traffic between said selected backbone nodes through said selected first links and allocating data traffic among said routes.

10. The computer system for selecting and evaluating data routes and arranging a data communication network according to claim 9, wherein the concentrators are statistical multiplexers with protocol conversion capabilities.

11. The computer system for selecting and evaluating data routes and arranging a data communication network according to claim 9, wherein said backbone nodes include data switches.

12. The computer system for selecting and evaluating data routes and arranging a data communication network according to claim 9, wherein said second links are data lines of telephone service providers.

13. The computer system for selecting and evaluating data routes and arranging a data communication network according to claim 9, wherein said first links are high volume data lines.

14. The computer system for selecting and evaluating data routes and arranging a data communication network according to claim 13, wherein said high volume data lines are fiber optic lines.

15. The method for selecting and evaluating data routes and arranging a data communication network according to claim 1, wherein said step (a) of clustering said terminals into terminal clusters and assigning said terminal clusters is performed in response to inputs including locations of terminals to be clustered and a weight for each of said locations of terminals to be clustered that represents data traffic carried by that location.

16. The method for selecting and evaluating data routes and arranging a data communication network according to claim 1, wherein said step (b) of selecting said backbone nodes from said set of backbone nodes and adding said selected backbone nodes to the network is performed in response to inputs including locations of each of said set of backbone nodes, locations of said terminals, and a traffic table which specifies data traffic between said terminals.

17. The method for selecting and evaluating data routes and arranging a data communication network according to claim 1, wherein said step (c) of selecting said concentrators from said set of concentrators, assigning said clustered terminals to said selected concentrators, and adding said selected concentrators to the network is performed in response to inputs including said set of concentrators, said terminal clusters, and terminal level requirements for a number of data communication lines and a volume of traffic.

18. A computer based method for selecting and evaluating data routes and arranging a data communication network having a number of terminals, said arranged network including backbone nodes, a plurality of first links connecting the backbone nodes, concentrators connected between said terminals and said backbone nodes, a plurality of second links disposed between and connecting said terminals and said concentrators, and a plurality of third links disposed between and connecting said concentrators and said backbone nodes, said method comprising steps of:
(a) clustering said terminals into terminal clusters and assigning said terminal clusters to virtual terminals, concentrator locations, or backbone node locations;
(b) selecting said backbone nodes from a set of backbone nodes to minimize the cost of the network and adding said selected backbone nodes to the network;
(c) selecting said concentrators from a set of concentrators, assigning said clustered terminals to said selected concentrators, and adding said selected concentrators to the network;
(d) selecting said first links from a set of first links to minimize the cost of said first links and said backbone nodes and adding said selected first links to the network to connect the selected backbone nodes; and
(e) evaluating routes for data traffic between said selected backbone nodes through said selected first links and allocating data traffic among said routes;
wherein said step (d) of selecting said first links to minimize the cost of said first links and said backbone nodes is performed in response to inputs including locations of the set of backbone nodes, a backbone traffic matrix which contains data traffic accumulated at a backbone level, and a list of links available for inclusion in the network as said first links connecting said backbone nodes.

19. The method for selecting and evaluating data routes and arranging a data communication network according to claim 1, wherein said selected backbone nodes and said selected first links together comprise a backbone topology and wherein said step (e) of evaluating routes for data traffic between said backbone nodes through said first links and allocating traffic among said routes is performed in response to inputs including said backbone topology and a backbone traffic matrix which contains data traffic accumulated at a backbone level.

20. The computer system for selecting and evaluating data routes and arranging a data communication network according to claim 9, wherein at least one of said means for clustering, means for selecting said backbone nodes, means for selecting said concentrators, means for selecting said first links, and means for evaluating routes is responsive to at least one other one of said means for clustering, means for selecting said backbone nodes, means for selecting said concentrators, means for selecting said first links, and means for evaluating routes.

21. The computer system for selecting and evaluating data routes and arranging a data communication network according to claim 20, wherein said means for selecting said backbone nodes from a set of backbone nodes and adding said selected backbone nodes to the network further refines the network configuration in response to said means for selecting said concentrators from a set of concentrators.

22. The computer system for selecting and evaluating data routes and arranging a data communication network according to claim 9, wherein said means for clustering said terminals into terminal clusters and assigning said terminal clusters is responsive to inputs including locations of terminals to be clustered and a weight for each of said locations of terminals to be clustered that represents data traffic carried by that location.

23. The computer system for selecting and evaluating data routes and arranging a data communication network according to claim 9, wherein said means for selecting said backbone nodes from said set of backbone nodes and adding said selected backbone nodes to the network is responsive to inputs including locations of each of said set of backbone nodes, locations of said terminals, and a traffic table which specifies data traffic between said terminals.

24. The computer system for selecting and evaluating data routes and arranging a data communication network according to claim 9, wherein said means for selecting said concentrators from said set of concentrators, assigning said clustered terminals to said selected concentrators, and adding said selected concentrators to the network is responsive to inputs including said set of concentrators, said terminal clusters, and terminal level requirements for a number of data communication lines and a volume of traffic.

25. The computer system for selecting and evaluating data routes and arranging a data communication network according to claim 9, wherein said means for selecting said first links to minimize the cost of said first links and said backbone nodes is responsive to inputs including locations of the set of backbone nodes, a backbone traffic matrix which contains data traffic accumulated at a backbone level, and a list of links available for inclusion in the network as said first links connecting said backbone nodes.

26. The computer system for selecting and evaluating data routes and arranging a data communication network according to claim 9, wherein said selected backbone nodes and said selected first links together comprise a backbone topology and wherein said means for evaluating routes for data traffic between said backbone nodes through said first links and allocating traffic among said routes is responsive to inputs including said backbone topology and a backbone traffic matrix which contains data traffic accumulated at a backbone level.

* * * * *